(12) United States Patent
Marr (10) Patent No.: US 6,768,617 B2
(45) Date of Patent: Jul. 27, 2004

(54) SETPOINT SILICON CONTROLLED RECTIFIER (SCR) ELECTROSTATIC DISCHARGE (ESD) CORE CLAMP

(75) Inventor: Kenneth W. Marr, Boise, ID (US)

(73) Assignee: Micron Technology, Inc., Boise, ID (US)

(*) Notice: Subject to any disclaimer, the term of this patent is extended or adjusted under 35 U.S.C. 154(b) by 15 days.

(21) Appl. No.: 10/112,774

(22) Filed: Apr. 2, 2002

(65) Prior Publication Data

US 2002/0109950 A1 Aug. 15, 2002

Related U.S. Application Data

(62) Division of application No. 09/502,788, filed on Feb. 11, 2000, now Pat. No. 6,430,016.

(51) Int. Cl.[7] .............................. H02H 9/04; H02H 3/22
(52) U.S. Cl. .......................................... 361/56; 361/111
(58) Field of Search ........................ 361/56, 100, 111, 361/58, 104, 117, 118, 119

(56) References Cited

U.S. PATENT DOCUMENTS

| | | | |
|---|---|---|---|
| 5,103,166 A | 4/1992 | Jeon et al. | |
| 5,440,162 A | 8/1995 | Worley et al. | |
| 5,541,801 A | 7/1996 | Lee et al. | |
| 5,550,699 A | 8/1996 | Diaz | |
| 5,594,611 A | 1/1997 | Consiglio et al. | |
| 5,615,074 A * | 3/1997 | Avery ........................... | 361/56 |
| 5,654,862 A | 8/1997 | Worley et al. | |
| 5,675,469 A | 10/1997 | Racino et al. | |
| 5,745,323 A | 4/1998 | English et al. | |
| 5,748,425 A | 5/1998 | Gutsch et al. | |
| 5,774,011 A | 6/1998 | Au et al. | |
| 5,815,360 A | 9/1998 | Consiglio et al. | |
| 5,825,600 A | 10/1998 | Watt | |
| 5,838,146 A | 11/1998 | Singer | |
| 5,862,031 A | 1/1999 | Wicker et al. | |
| 5,959,820 A | 9/1999 | Ker et al. | |
| 6,069,782 A * | 5/2000 | Lien et al. ................... | 361/111 |
| 6,225,818 B1 * | 5/2001 | Park et al. ................... | 324/763 |
| 6,233,130 B1 | 5/2001 | Lin | |
| 6,430,016 B1 * | 8/2002 | Marr ........................... | 361/56 |

OTHER PUBLICATIONS

Maloney, Timothy J., "Novel Clamp Circuits for IC Power Supply Protection," IEEE Transactions on Components and Manufacturing Technology—Part C, vol. 19, No. 3, Jul. 1996, pp. 150–161.

Voldman, Steven H., et al., "Analysis of snubber–clamped diode–string mixed voltage interface ESD protection network for advanced microprocessors," Journal of Electrostatics 38, (1996), pp. 3–31.

* cited by examiner

Primary Examiner—Gregory J. Toatley, Jr.
(74) Attorney, Agent, or Firm—Dickstein Shapiro Morin & Oshinsky LLP (57) ABSTRACT

An adjustable setpoint ESD core clamp for ESD protection circuits is disclosed. The core clamp includes an SCR whose P+N trigger junction is referenced to a diode stack. The SCR is non-avalanche triggered into a low impedance state at a set value of $V_{cc}$, as determined by the diode stack, which allows the ESD device to turn on at a lower voltage, thereby protecting internal circuitry.

17 Claims, 5 Drawing Sheets

SETPOINT SILICON CONTROLLED RECTIFIER (SCR) ELECTROSTATIC DISCHARGE (ESD) CORE CLAMP

This application is a Divisional Application of U.S. patent application Ser. No. 09/502,788, issued on Feb. 11, 2000 as U.S. Pat. No. 6,430,016.

BACKGROUND OF THE INVENTION

1. Field of the Invention

The present invention relates generally to protection devices for integrated circuits, and more particularly to a method and apparatus for protecting integrated circuits from various electrical transients, including electrostatic discharge (ESD).

2. Description of the Related Art

As technology in very large scale integration (VLSI) improves thereby further decreasing circuit geometries, integrated circuits (ICs) become more susceptible to damage from electrical over stress (EOS) events. EOS events include very fast transients, such as electrostatic discharge (ESD).

ESD is a well-known cause of operation failure of integrated circuits. The buildup of electrostatic charge on personnel and equipment during the manufacture and use of integrated circuits can reach potentials as high as 30,000 volts with respect to an ESD reference point. During an ESD event, this charge is transferred between one or more pins of the device, i.e., integrated circuit, and another conducting object in a time period that is typically less than one microsecond. The electrostatic discharge may occur during manufacturing or testing when the integrated circuit is non-operating, or it may occur when the integrated circuit is installed in a device and is operating. Integrated circuits are particularly susceptible to ESD damage during handling in a manufacturing, testing or printed circuit board assembly environment. An electrostatic discharge through an integrated circuit can permanently damage the integrated circuit through several failure mechanisms, including the dielectric breakdown of oxides and other thin layers, and the melting of semiconductive material such as silicon, resulting in excessive leakage currents and open or short circuits within the integrated circuit.

Accordingly, manufacturers take considerable care to protect semiconductor devices from such ESD events. Protection circuits may typically be connected to all Input/Output (I/O) pads of an integrated circuit to safely dissipate the energy associated with ESD events without causing any damage to the circuitry internal to the device. Protection circuits have also been connected to the power supply pads, or between power supply buses to prevent such damage to internal circuits.

Figure 1:
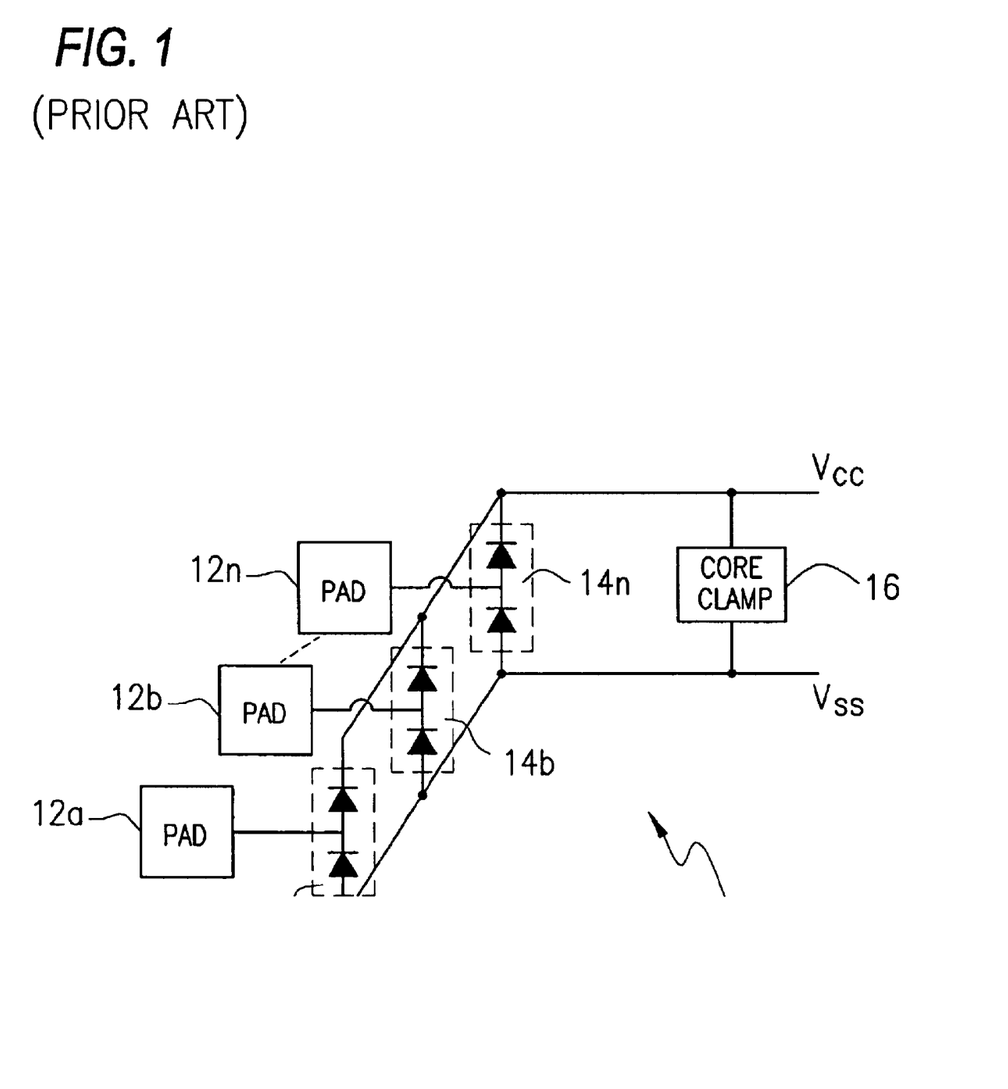
FIG. 1 illustrates a conventional device for protecting a semiconductor circuit from ESD events.

FIG. 1 illustrates one conventional device 10 for protecting a semiconductor circuit from ESD events. Device 10 is adapted for use in connection with a plurality of input pads, such as input pads 12a, 12b, . . . 12n. Each of the input pads 12a–12n are further connected to an input buffer (not shown) as is known in the art. Device 10 includes a plurality of diode clamping circuits, such as circuits 14a, 14b, 14n. The positive power supply bus for the integrated circuit, designated $V_{CC}$, is protected against ESD with respect to the negative power supply bus of the integrated circuit, $V_{SS}$, and vice versa, using a core clamp 16. Conventional core clamps, including field snap-back (FSB) transistors, metal-oxide-semiconductor (MOS) devices, diode strings, Silicon Controlled Rectifiers (SCR), Low Voltage Trigger Silicon Controlled Rectifiers (LTVSCR) and the like, are well known in the art.

There are problems, however, with conventional core clamps, as they have been found to be ineffective in certain circumstances. For example, with a conventional core clamp, the protective devices may be insufficient to completely protect silicide layers within the integrated circuit from the heat generated by the power dissipation of the protective device during an ESD event. Furthermore, the voltage drop during an ESD event across the series combination of the forward biased diode (in diode clamping circuit 14) and the core clamp 16 is typically too high to protect a pull-down device (not shown) connected to a pad 12. Additionally, the voltage levels could also be too high to protect the input buffers connected to the pads.

SUMMARY OF THE INVENTION

The present invention alleviates the problems associated with the prior art and provides an adjustable setpoint ESD core clamp.

In accordance with the present invention, a core clamp includes an SCR whose P+N trigger junction is referenced to a diode stack. The SCR is non-avalanche triggered into a low impedance state at a set value of $V_{cc}$, as determined by the diode stack, which allows the ESD device to turn on at a lower voltage, thereby protecting internal circuitry.

These and other advantages and features of the invention will become more readily apparent from the following detailed description of the invention which is provided in connection with the accompanying drawings.

DETAILED DESCRIPTION OF THE PREFERRED EMBODIMENTS

The present invention will be described as set forth in the preferred embodiments illustrated in FIGS. 2–4. Other embodiments may be utilized and structural or logical changes may be made without departing from the spirit or scope of the present invention. Like items are referred to by like reference numerals.

In accordance with the present invention, a core clamp includes an SCR whose P+N trigger junction is referenced to a diode stack. The SCR is triggered into a low impedance state at a set value of $V_{cc}$, as determined by the diode stack. FIG. 2 illustrates in schematic diagram form a core clamp 100 in accordance with the present invention. Core clamp 100 can be used in place of core clamp 16 in the ESD protective device 10 as illustrated in FIG. 1.

Core clamp 100 includes a silicon-controlled rectifier (SCR) 102, which includes a pnp transistor 104, a npn transistor 106 and resistor 108. The emitter 110 of transistor 104 is connected to $V_{CC}$. The collector 112 of transistor 104 is connected to resistor 108 and further connected to the base 124 of transistor 106. The emitter 122 of transistor 106 is connected to resistor 108 and further connected to $V_{SS}$. The collector 120 of transistor 106 is connected to the base 114 of transistor 104.

In accordance with the present invention, the base 114 of transistor 104 is connected to a terminal of a load impedance, such as for example the drain 136 of a PMOS transistor 130, and a diode stack consisting of a plurality of N diode connected transistors 140a–140n. Another terminal of the load, i.e., source 132 of transistor 130, is connected to $V_{cc}$. The gate 134 of transistor 130 is connected to $V_{SS}$, thereby maintaining transistor 130 in an "on" state. Alternatively, the load impedance could be a resistor.

Figure 2:
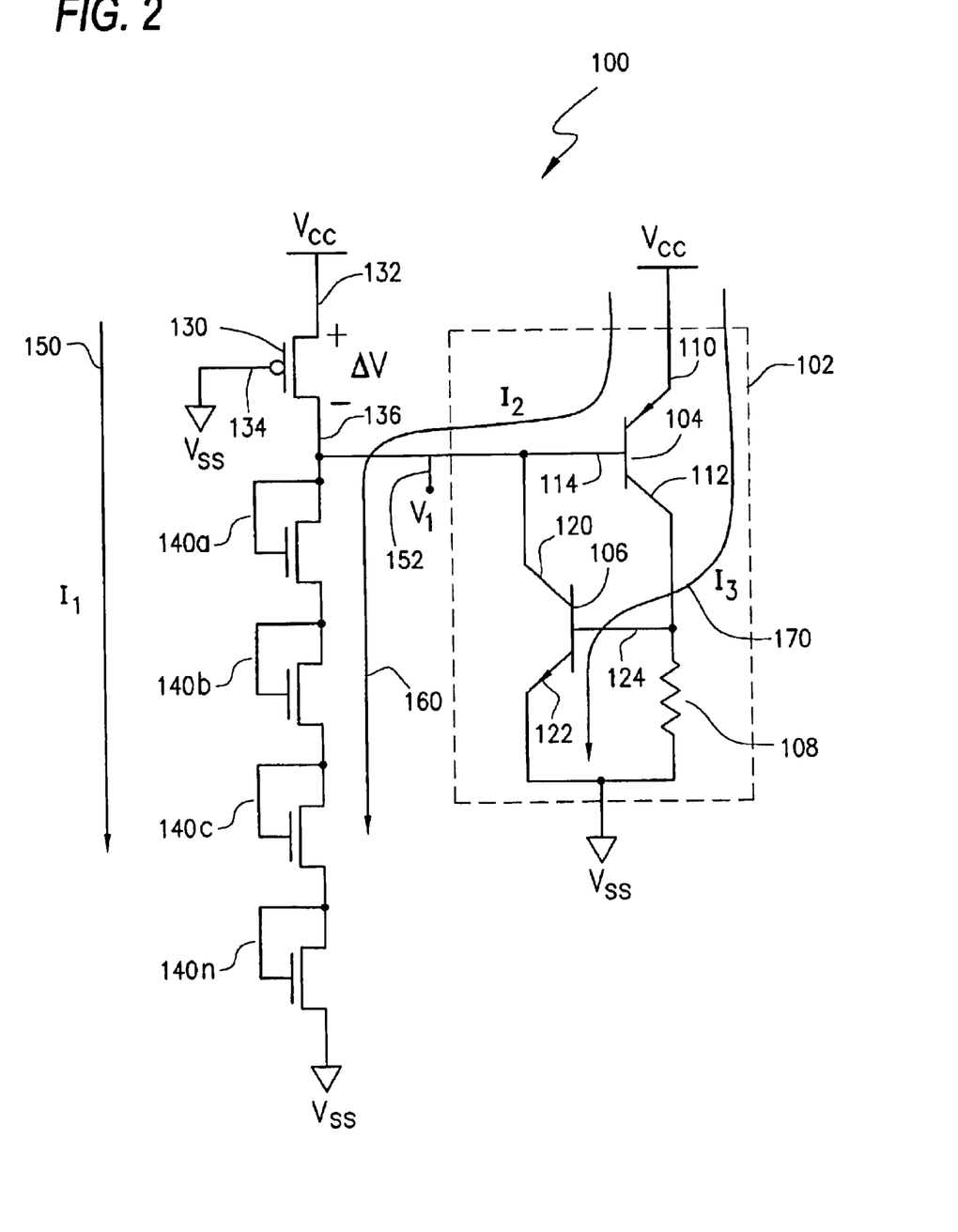
FIG. 2 illustrates in schematic diagram form a core clamp in accordance with the present invention.

It is important to note that while four diodes, i.e., 140a, 140b, 140c, and 140n, are illustrated in FIG. 2, the invention is not so limited and any number may be used. By varying the number of diodes N and/or the size of the diodes in the diode string in accordance with the present invention, it is possible to set the trigger voltage at which the circuit will enter into a low impedance state as will be further described below. FIG. 4A illustrates a diode stack 200 that can be used with the core clamp 100 illustrated in FIG. 2. In diode stack 200, the number of diodes N connected in the diode stack 200 can be programmed, thereby setting the trigger voltage at which the SCR 102 will enter a low impedance state.

Diode stack 200 includes a plurality of N diode connected transistors 140a–140n, connected in series. A programmable element, such as for example a fuse, is connected between the junction of each pair of diodes and $V_{SS}$. Alternatively, an anti-fuse could also be used as the programmable element. Thus, fuse 210 is connected between the junction of diodes 140a, 140b and $V_{SS}$, fuse 212 is connected between the junction of diodes 140b, 140c and $V_{SS}$, and fuse 214 is connected between the junction of diodes 140c, 140n and $V_{SS}$. It should be understood that while four diodes, i.e., 140a, 140b, 140c, and 140n, and three corresponding fuses 210–214 are illustrated in FIG. 4A, the invention is not so limited and any number may be used. In accordance with the present invention, the number of diodes N can be selectively programmed by selectively opening one or more of the fuses 210–214. Thus, for example, if it is desired to have all four diodes 140a–140n remain in the circuit, i.e., N=4, fuses 210, 212, and 214 will be opened. If it is desired to have only two diodes in the circuit, i.e., N=2, fuses 210 and 214 will be opened, and fuse 212 will be left intact, thereby effectively leaving only diodes 140a and 140b in the circuit. By varying the number of diodes N in the diode stack 200 in accordance with the present invention, it is possible to set the trigger voltage at which the circuit 100 will enter into a low impedance state as will be further described below.

Figure 4A:
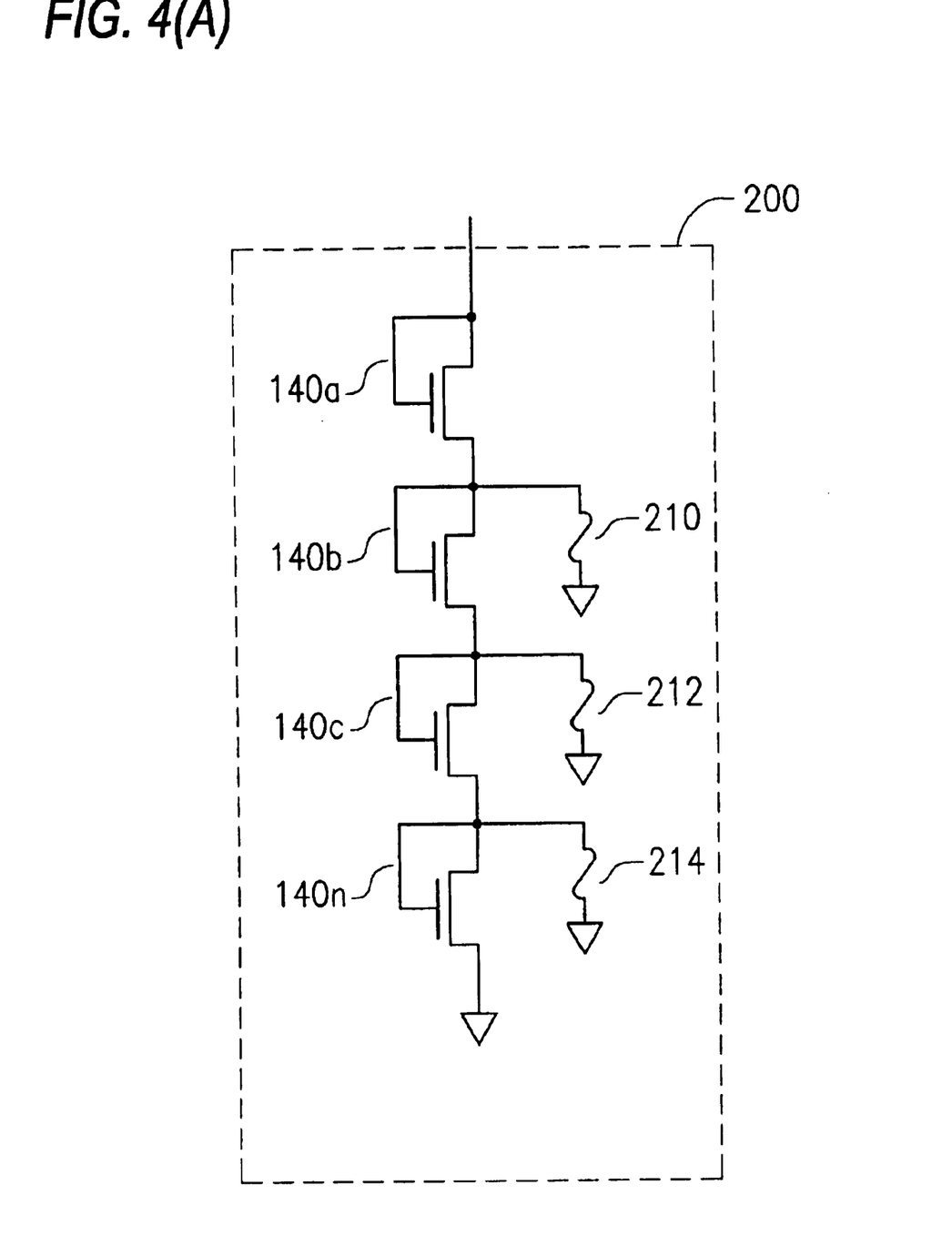
FIG. 4A illustrates in schematic diagram form one method for setting the trigger voltage according to the present invention by programming the number of diodes.
Figure 4B:
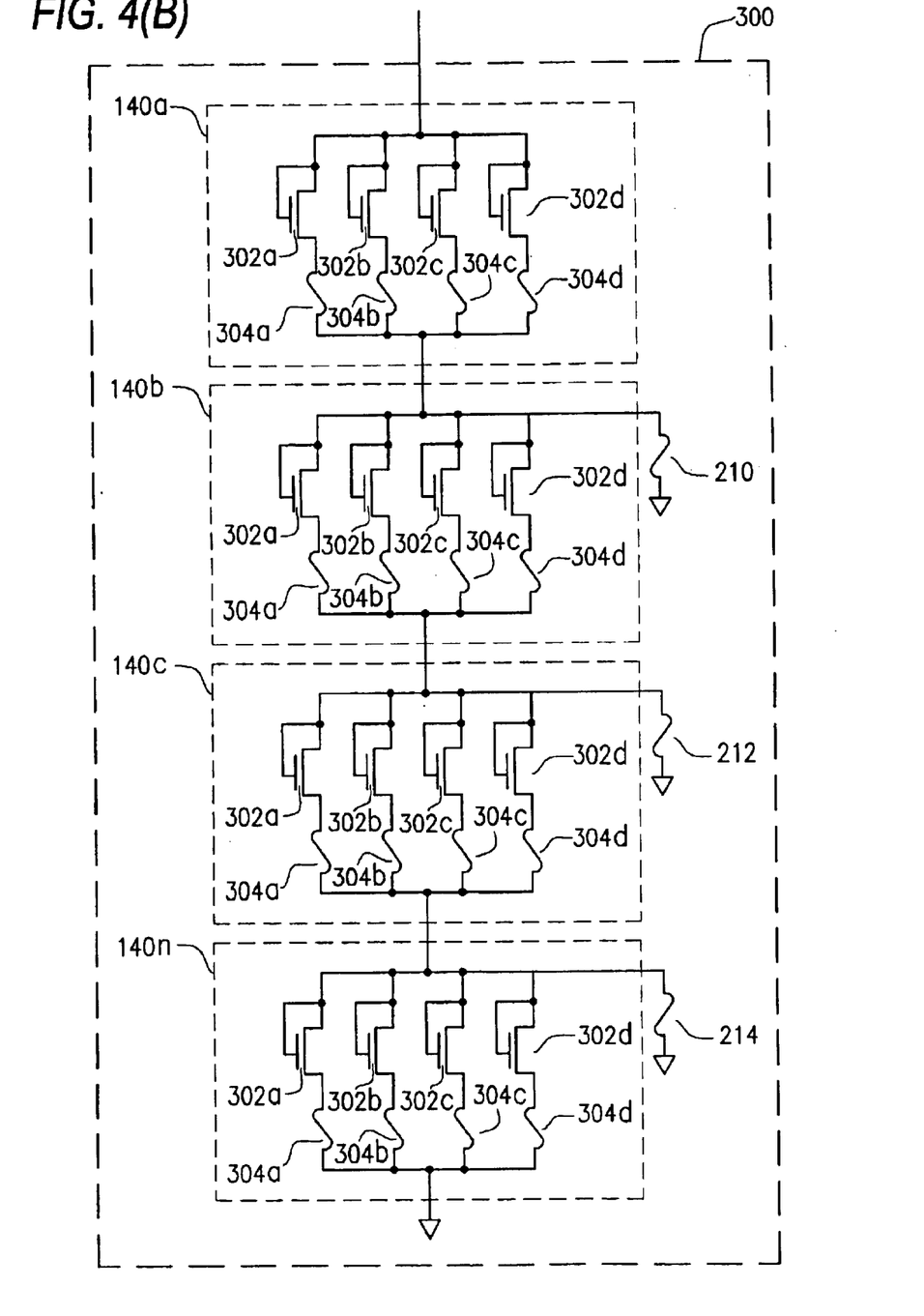
FIG. 4B illustrates in schematic diagram form another method for setting the trigger voltage according to the present invention by programming the size of each diode.

It is also possible to further adjust the trigger voltage by varying the relative size and number of diodes in the diode stack as illustrated in FIG. 4B, which shows a diode stack 300 that can be used with the core clamp 100 illustrated in FIG. 2. In diode stack 300, the size and the number of diodes N connected in the diode stack 300 can be programmed, thereby setting the trigger voltage at which the SCR 102 will enter a low impedance state.

Diode stack 300 includes a plurality of N diode connected transistors 140a–140n, connected in series. Each diode connected transistor 140a–140n comprises four diode connected transistors 302a–302n connected in parallel. A programmable element, such as for example a fuse 304a–304n, is connected between each diode 302a–302n and the diode output. Alternatively, the programmable elements may be anti-fuses. It should be understood that while four transistor connected diodes connected in parallel are illustrated for each diode 140a–140n, the invention is not so limited and any number of diodes connected in parallel may be used. In accordance with the present invention, the relative size of each diode 140a–140n can be selectively programmed by selectively programming the programmable elements, i.e., by opening fuses 304a–304n. Thus, for example, if it is desired to decrease the relative size of diode 140a, one or more of fuses 304a–304n will be opened, thereby reducing the number of the diodes 302a–302n which make up diode 140a. By varying the relative size of each diode 140a–140n in the diode stack in accordance with the present invention, it is possible to set the trigger voltage at which the circuit 100 will enter a low impedance state as will be further described below.

Diode stack 300 can also be provided with programmable elements, such as for example fuses 210–214, connected between the junction of each pair of diodes and $V_{SS}$, as described with respect to FIG. 4A. By varying both the number and the relative size of the diodes in the diode stack, it is possible to finely adjust the trigger voltage at which the circuit 100 will enter into a low impedance state.

The operation of the core clamp 100 is as follows. If $V_{CC}$ is less than the approximate product of the number of diodes N and the threshold voltage Vt of each diode connected transistor, the core clamp 100 will be inoperative since the diodes 140a–140n will not conduct, and $I_1$, $I_2$, and $I_3$, will all be zero. That is, If $V_{CC} < \approx N*Vt$, then $I_1 = I_2 = I_3 = 0$.

If $V_{CC}$ increases, such as for example by the accumulation of electrostatic charge, to a level greater than the product of the number of diodes N and the threshold voltage Vt of each diode connected transistor, the diode stack 140a–140n will start to conduct and some current $I_1$ will flow through transistor 130 and the diode stack 140a–140n as indicated by the direction of arrow 150 of FIG. 2. Thus, If $V_{CC} > \approx N*Vt$, then $I_1 > 0$.

As current $I_1$ flows, a voltage drop $\Delta V$ will develop across transistor 130. The voltage V1 at node 152 will be clamped at the value of N*Vt, thus allowing a voltage drop $\Delta V$ across transistor 130 and subsequently across the base-emitter trigger-junction of transistor 104. By limiting the voltage drop across the core clamp 102 during an ESD event in accordance with the present invention, core clamp 102 provides better protection for any pull-down devices (not shown) or input buffers (not shown) connected to pad 12 than conventional core clamps.

When the voltage drop $\Delta V$ across transistor 130 exceeds approximately 0.6 volts, current $I_2$ will begin to flow, in the direction indicated by arrow 160 of FIG. 2, which will trigger the SCR 102 to enter into a low impedance state. Once the SCR 102 has been triggered by current $I_2$, current $I_3$ will flow in the direction indicated by arrow 170 from $V_{CC}$ to $V_{SS}$, thereby transferring any built-up charge without damaging any internal circuitry of the semiconductor device.

Thus, in accordance with the present invention, ESD protection is provided by an adjustable setpoint ESD core clamp that includes an SCR whose P+N trigger junction is referenced to a diode stack. The SCR is triggered into a low impedance state at a set value of $V_{cc}$, as determined by the diode stack, thereby providing sufficient protection for an integrated circuit from an ESD event.

Figure 3:
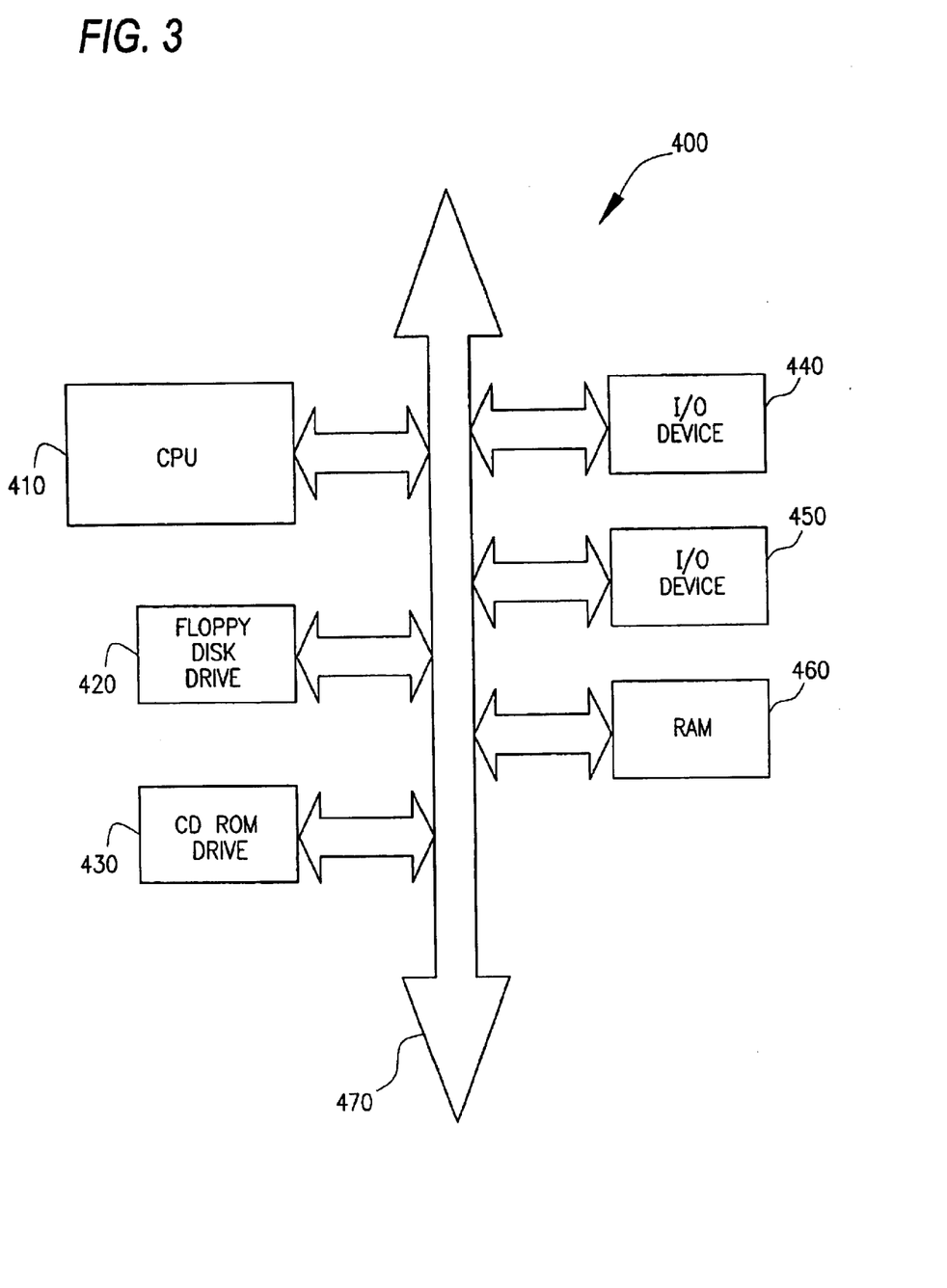
FIG. 3 illustrates in block diagram form a processor system in which an integrated circuit with an ESD protection circuit in accordance with the present invention can be used.

A typical processor based system which includes integrated circuits that utilize a core clamp 100 according to the present invention for ESD protection is illustrated generally at 400 in FIG. 3. A computer system is exemplary of a system having integrated circuits, such as for example memory circuits. Most conventional computers include memory devices permitting storage of significant amounts of data. The data is accessed during operation of the computers. Other types of dedicated processing systems, e.g., radio systems, television systems, GPS receiver systems, telephones and telephone systems also contain memory devices which can utilize the present invention.

A processor based system, such as a computer system, for example, generally comprises a central processing unit (CPU) 410, for example, a microprocessor, that communicates with one or more input/output (I/O) devices 440, 450 over a bus 470. The computer system 400 also includes random access memory (RAM) 460, and, in the case of a computer system may include peripheral devices such as a floppy disk drive 420 and a compact disk (CD) ROM drive 430 which also communicate with CPU 410 over the bus 470. RAM 460 is preferably constructed as an integrated circuit which includes an ESD protection circuit having a core clamp 100 as previously described with respect to FIG. 2. It may also be desirable to integrate the processor 410 and memory 460 on a single IC chip.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for discharging an electrostatic charge comprising:
    setting a load to conduct a first current when a voltage drop across said load exceeds a specified value, said specified value being determined by a number of diodes connected to said load;
    triggering an SCR including a base terminal to conduct a second current through said base terminal when said first current is conducted by said load;
    discharging said electrostatic charge through said SCR by a third current triggered by said second current; and
    selectively programming said number of diodes connected to said load by programming at least one programmable element associated with a respective diode.

2. The method according to claim 1, further comprising:
    maintaining said SCR in a non-current conducting state if said voltage drop across said load does not exceed said specified value.

3. A method for limiting a voltage applied to an electronic system comprising:
    conducting a first current from a voltage supply through a load transistor into a first node;
    conducting a second current our of said first node into a plurality of series connected diodes coupled to said first node;
    conducting a third current out of said first node into a base node of a silicon controlled rectifier coupled to said first node, said silicon controlled rectifier having a trigger junction; around said selected diodes selectively programming a number of said series connected diodes.

4. A method as defined in claim 3, wherein said trigger junction is a P+N trigger junction.

5. A method as defined in claim 3, wherein said conducting said second current further comprises:
    developing a trigger voltage at said first node, and wherein said plurality of diodes includes a diode-connected field-effect transistor.

6. A method as defined in claim 3, wherein said silicon controlled rectifier comprises:
    a plurality of discrete bipolar junction transistors.

7. A method of operating a voltage transient protection circuit comprising:
    receiving a first relative voltage between first and second nodes of an electronic circuit, said relative voltage including a supply voltage component and a transient voltage component;
    conducting a first current through a load device and a plurality of voltage regulating devices, said load device and said plurality of voltage regulating devices being coupled in series with one another between said first and second nodes, at least one of said voltage regulating devices including a programmable element adapted to programmably shunt said at least one voltage regulating device;
    receiving a second voltage from a third node at an input gate of an SCR device, said third node being coupled between said load device and said plurality of voltage regulating devices; and
    conducting a second current through said SCR device from said first node to said second node.

8. A method of operating a voltage transient protection circuit as defined in claim 7 wherein said plurality of voltage regulating devices comprises a plurality of diodes.

9. A method of operating a voltage transient protection circuit as defined in claim 7 wherein said plurality of voltage regulating devices comprises a plurality of diode-connected transistors.

10. A method of operating a voltage transient protection circuit as defined in claim 7 wherein said programmable element comprises a fuse element.

11. A method of operating a voltage transient protection circuit as defined in claim 7 wherein said programmable element comprises an antifuse element.

12. A method of operating a voltage transient protection circuit as defined in claim 7 wherein at least one voltage regulating device of said plurality of voltage regulating devices comprises two diode-connected transistors coupled in parallel with one another.

13. A method of operating a voltage transient protection circuit as defined in claim 7 wherein said transient voltage component comprises an electrostatic discharge voltage.

14. A method of operating a voltage transient detection circuit as defined in claim 7 wherein said load device comprises a transistor.

15. A method of manufacturing a transient protection circuit comprising:
    forming first and second voltage nodes and a third triggering node;
    coupling an SCR between said first and second voltage nodes;
    coupling a triggering input of said SCR to said third triggering node
    coupling a load device between said first node and said third triggering node;
    coupling first and second transistors in series with one another between said third triggering node and said second node;

coupling a first programmable shunt device in parallel with said first transistor;

coupling a second programmable shunt device in parallel with said second transistor; and programming at least one of said first and second programmable shunt devices.

16. A method of manufacturing a transient protection circuit as defined in claim 15 wherein said programming said at least one of said first and second programmable shunt devices comprises opening a fuse device.

17. A method of manufacturing a transient protection circuit as defined in claim 15 wherein said programming said at least one of said first and second programmable shunt devices comprises shorting an antifuse device.

* * * * *

UNITED STATES PATENT AND TRADEMARK OFFICE
CERTIFICATE OF CORRECTION

PATENT NO. : 6,768,617 B2
DATED : July 27, 2004
INVENTOR(S) : Kenneth W. Marr

It is certified that error appears in the above-identified patent and that said Letters Patent is hereby corrected as shown below:

<u>Column 5,</u>
Lines 54-67, please rewrite claim 3 as follows:

A method for limiting a voltage applied to an electronic system comprising:

conducting a first current from a voltage supply through a load transistor into a first node;

conducting a second current out of said first node into a plurality of series connected diodes coupled to said first node;

conducting a third current out of said first node into a base node of a silicon controlled rectifier coupled to said first node, said silicon controlled rectifier having a trigger junction;

bringing said silicon controlled rectifier into a low impedance state when said third current achieves a threshold value, whereby said silicon controlled rectifier conducts a fourth current out of said voltage source and thereby limits a voltage thereof to produce a limited voltage;

applying said limited voltage to an electronic system;

selecting one or more of said plurality of diodes, and shunting said second current around said selected diodes; and       selectively programming a number of said series connected diodes.

Signed and Sealed this

Eighth Day of March, 2005

JON W. DUDAS
*Director of the United States Patent and Trademark Office*